United States Patent
Rastogi et al.

(10) Patent No.: US 11,693,884 B2
(45) Date of Patent: Jul. 4, 2023

(54) ADAPATIVE SYSTEM FOR PROCESSING DISTRIBUTED DATA FILES AND A METHOD THEREOF

(71) Applicant: HCL TECHNOLOGIES LIMITED, New Delhi (IN)

(72) Inventors: Avnish Kumar Rastogi, Noida (IN); Nitin Narang, Sunnyvale, CA (US); Mohammad Ajmal, Noida (IN)

(73) Assignee: HCL TECHNOLOGIES LIMITED, New Delhi (IN)

( * ) Notice: Subject to any disclaimer, the term of this patent is extended or adjusted under 35 U.S.C. 154(b) by 135 days.

(21) Appl. No.: 16/809,089

(22) Filed: Mar. 4, 2020

(65) Prior Publication Data
US 2021/0279259 A1 Sep. 9, 2021

(51) Int. Cl.
*G06F 16/28* (2019.01)
*G06F 16/27* (2019.01)
*G06F 16/25* (2019.01)

(52) U.S. Cl.
CPC .......... *G06F 16/283* (2019.01); *G06F 16/254* (2019.01); *G06F 16/27* (2019.01)

(58) Field of Classification Search
CPC ....... G06F 16/283; G06F 16/27; G06F 16/254
See application file for complete search history.

(56) References Cited

U.S. PATENT DOCUMENTS

| 7,146,399 | B2 | 11/2006 | Fox et al. | |
|---|---|---|---|---|
| 9,223,827 | B2 | 12/2015 | Hou et al. | |
| 9,489,397 | B1 | 11/2016 | Olson | |
| 2011/0153562 | A1* | 6/2011 | Howard | G06F 16/275 707/620 |
| 2016/0171067 | A1* | 6/2016 | Acker | G06F 16/2272 707/627 |
| 2017/0078094 | A1* | 3/2017 | Olson | H04L 9/0825 |

FOREIGN PATENT DOCUMENTS

CN 107992519 A 5/2018

* cited by examiner

*Primary Examiner* — Charles D Adams

(57) ABSTRACT

The present disclosure relates to a system and a method for processing distributed data files. The processor executes instructions to receive a set of instructions from a primary device, wherein the set of instructions comprises verification rules, validators, primary transformers and structure query transformers; generate processed data files by processing the distributed data files. The distributed data files are processed by performing at least one of: executing one of the verification rules, the validators and the primary transformers on the distributed data files; and transforming the distributed data files by executing the structure query transformers. The execution of the structured query transformers comprises steps of generating a dependency graph based upon dependencies between the structure query transformers; and determining a sequence of execution of the structured query transformers based upon the dependency graph; and transfer the processed data files to a data warehouse.

16 Claims, 3 Drawing Sheets

ADAPATIVE SYSTEM FOR PROCESSING DISTRIBUTED DATA FILES AND A METHOD THEREOF

CROSS-REFERENCE TO RELATED APPLICATIONS AND PRIORITY

The present application does not claim priority from any patent application.

TECHNICAL FIELD

The present disclosure in general relates to a system for processing distributed data files and a method thereof.

BACKGROUND

In a communication network, with the explosion in data, there is a need for data warehouses which can handle very large files. Data in such data warehouses is stored in a distributed manner. Such distributed data files are consumed by the data warehouse and are validated, transformed, processed and loaded/stored in the data warehouse. Data is pushed to the warehouses by multiple sources and most often, the data warehouse does not have any control on the source of the data being consumed. With the growth in the volume and size of data, the computer systems become inefficient to process the incoming data.

The speed with which the new data sets are being generated, there is a high likelihood that the data sources may change, or the format of the data file may change. Existing files may also get modified or their formats may be changed. Further, it may be possible that position of attribute(s) in the data file changes or new attributes get added to the data files over a period. The changes in the upstream systems breaks the data warehouse systems, causing a significant downtime to address/configure and/or support new set of files or file formats or new set of rules.

SUMMARY

Before the present systems and methods for processing distributed data files, is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only and is not intended to limit the scope of the present application. This summary is provided to introduce concepts related to systems and method for processing distributed data files. This summary is not intended to identify essential features of the claimed subject matter nor is it intended for use in determining or limiting the scope of the claimed subject matter.

In one implementation, a system for processing distributed data files is illustrated. The system may comprise a processor and a memory coupled with the processor. The processor may be configured to execute instructions stored in the memory. The processor may execute instructions to receive a set of instructions from a primary device, wherein the set of instructions may comprise verification rules, validators, primary transformers and structured query transformers. The processor may further execute instructions to generate processed data files by processing the distributed data files based on one or more characteristics of the distributed data files. The distributed data files may be processed by performing at least one of the following steps. The distributed data files may be processed by executing one of the verification rules, the validators or the primary transformers on the distributed data files; or by transforming the distributed data files by executing the structured query transformations on the distributed data files. The execution of the structured query transformers may comprise steps of generating a dependency graph based upon dependencies between the structured query transformers; and determining a sequence of execution of the structured query transformers based upon the dependency graph. The processor may further execute instructions to transfer the processed data files to a data warehouse.

In another implementation, a method for processing distributed data files is illustrated. The method may comprise receiving, by a processor, a set of instructions from a primary device, wherein the set of instructions comprises verification rules, validators, primary transformers or structured query transformers. The method may further comprise generating, by the processor, processed data files by processing the distributed data files based on one or more characteristics of the distributed data files. The distributed data files may be processed by performing at least one of the following steps. The distributed data files may be processed by executing one of the verification rules, the validators or the primary transformers on the distributed data files; or by transforming the distributed data files by executing the structured query transformations on the distributed data files. The execution of the structured query transformers may comprise steps of generating a dependency graph based upon dependencies between the structured query transformers; and determining sequence of execution of the structured query transformers based upon the dependency graph. The method may further comprise transferring, by the processor, the processed data files to a data warehouse.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
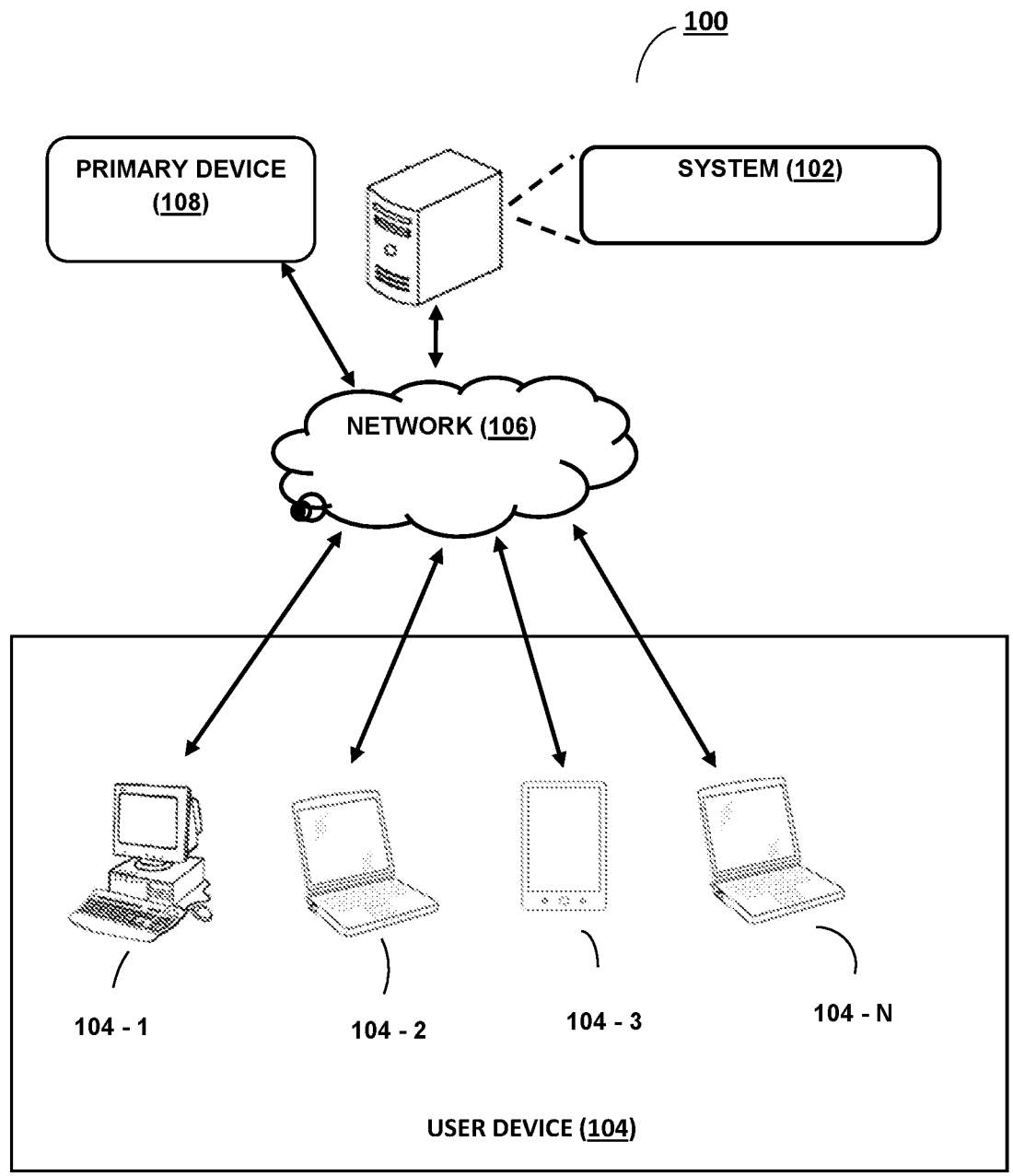
FIG. 1 illustrates a network implementation of the system for processing distributed data files, in accordance with an embodiment of the present subject matter.

Some embodiments of the present disclosure, illustrating all its features, will now be discussed in detail. The words "receiving", "generating", "executing", "transforming", "determining", "transmitting" and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for processing distributed data files are now described. The disclosed embodiments of the system and method for processing distributed data files are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for processing distributed data files is not intended to be limited to the embodiments illustrated but is to be accorded the widest scope consistent with the principles and features described herein.

In a communication network, the speed with which the new data sets are being generated, there is a high likelihood that the data sources may change, or the format of the data file may change. Existing files may also get modified or their formats may be changed. Further, it may be possible that position of attribute(s) in the data file changes or new attributes get added to the data files over a period. The changes in the upstream systems breaks the data warehouse systems, causing a significant downtime to address/configure and/or support new set of files or file formats or new set of rules. Because of this, the system becomes inefficient.

The present subject matter relates to processing distributed data files. In one embodiment, a system may comprise a processor and a memory coupled with the processor. The processor may be configured to execute instructions stored in the memory. The processor may execute instructions to receive a set of instructions from a primary device, wherein the set of instructions may comprise verification rules, validators, primary transformers and structured query transformers. The processor may further execute instructions to generate processed data files by processing the distributed data files based on one or more characteristics of the distributed data files. The distributed data files may be processed by performing at least one of the following steps. The distributed data files may be processed by executing at least one of the verification rules, the validators and/or the primary transformers on the distributed data files; or by transforming the distributed data files by executing the structured query transformers on the distributed data files. The execution of the structured query transformers may comprise steps of generating a dependency graph based upon dependencies between the structured query transformers; and determining a sequence of execution of the structured query transformers based upon the dependency graph. The processor may further execute instructions to transfer the processed data files to a data warehouse.

The system for processing distributed data files is advantageous because the system may be configured to decouple the processing of the distributed data files from the data warehouse. The system may be configured to verify, validate and transform the distributed data files to a format that can be readily consumed by the data warehouse by retaining existing implementation of the system. The system is advantageous because it handles any change in upstream data sources, format changes and attribute changes without any downtime for the data processing. Further, the system handles structured query transformations to be applied on the distributed data files without any modification/changes to the existing implementation of the system. Any new data sources or distributed data files may be added to the system by just providing a new configuration file or modifying an existing configuration file. The new transformers, validators, verification rules to be supported by the system may be specified by adding new methods and providing the methods to the system through a software library. The system may comprise a core processing engine. The core processing engine may not change for supporting any new set of verification rules, validators or transformers. Therefore, the system provides efficient, accurate and faster processing of the distributed data files. Further, the system provides significant cost savings.

Referring now to FIG. 1, a network implementation 100 of the system 102 for processing distributed data files is disclosed. Although the present subject matter is explained considering that the system 102 is implemented on a distributed cluster of servers or computing machines, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it may be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106. Further, the system 102 may be communicatively coupled to a primary device 108. Examples of the primary device 108 may be various computing devices such as but are not limited to a laptop computer, a desktop computer, a notebook, a workstation, a mainframe computer, a server, a network server, and the like.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
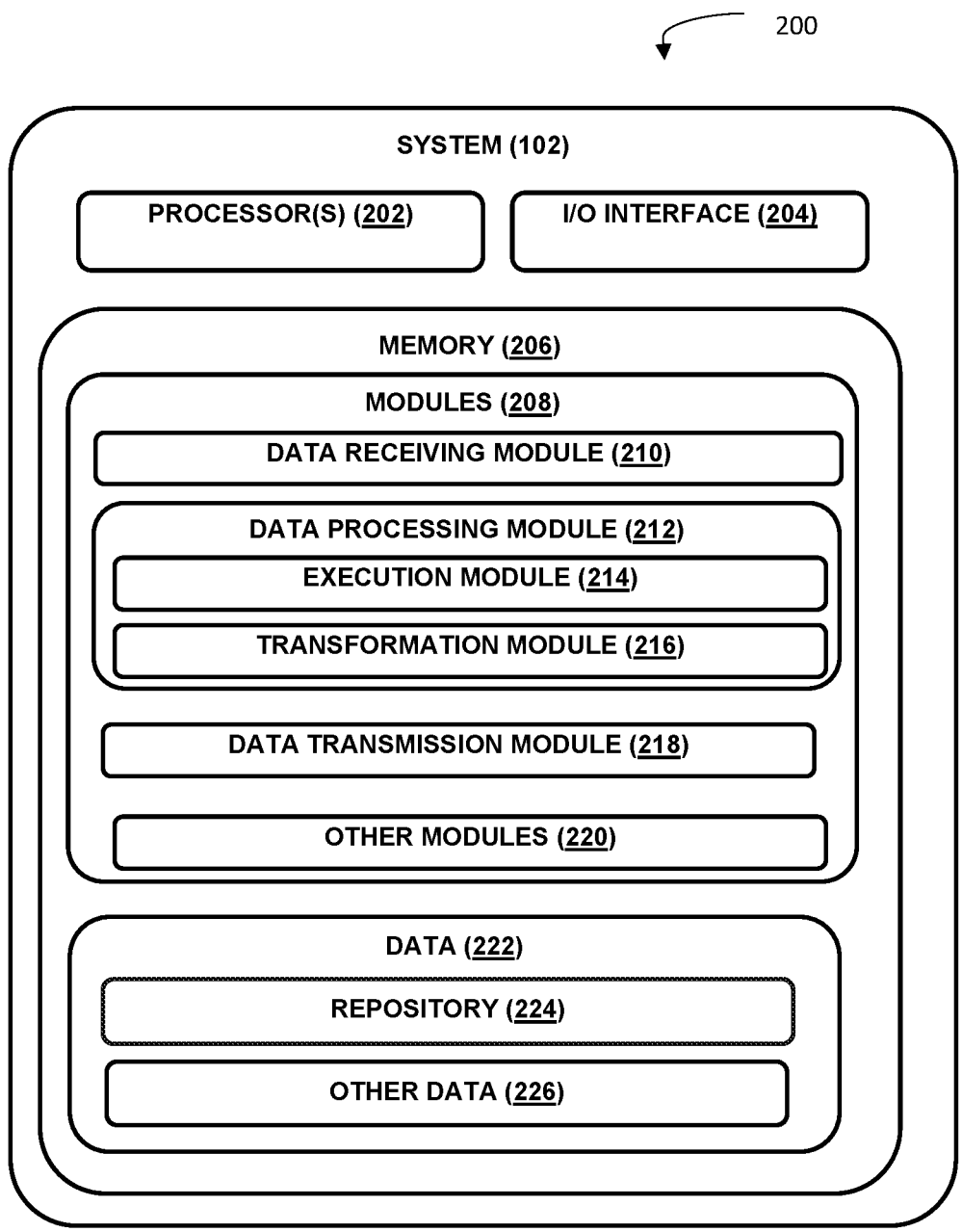
FIG. 2 illustrates various components of the system for processing distributed data files, in accordance with an embodiment of the present subject matter.

Referring now to FIG. 2, various components 200 of the system 102 for processing distributed data files is illustrated, in accordance with an embodiment of the present subject matter.

In one embodiment, the system 102 may include at least one processor 202, an input/output (I/O) interface 204, and a memory 206. The processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 222.

The modules 208 may include routines, programs, objects, components, data structures, and the like, which perform particular tasks, functions or implement particular abstract data types. In one implementation, the module 208 may include a data receiving module 210, a data processing module 212, a data transmission module 218 and other modules 220. The data processing module 212 may further include an execution module 214 and a transformation module 216. The other modules 220 may include programs or coded instructions that supplement applications and functions of the system 102.

The data 222, amongst other things, serve as a repository for storing data processed, received, and generated by one or more of the modules 208. The data 224 may also include a repository 224, and other data 226. In one embodiment, the other data 226 may include data generated as a result of the execution of one or more modules 208 in the other modules 220.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the data receiving module 210 may receive a set of instructions from a primary device 108. The set of instructions may comprise verification rules, validators, primary transformers or structured query transformers. The data receiving module 210 may further receive distributed data files from the user device 104. The distributed data files may be of any size although the system is designed to handled very large size distributed files. Each of the distributed data files may comprise various attributes.

In one aspect, the system defines a set of basic validators and transformers called base modules. The base modules define basic attributes and behaviour of validators and transformers. Any validators and transformers whose behaviour is not covered by the existing validators/transformers may create a new set of validators or transformers by extending these core validators/transformers and provide their own implementation of the required behaviour. This makes the system flexible. Further, any new validators or transformers thus implemented may be provided to the system as a shared library that may be loaded by the system at run time or as a static library which can be bound to the software system at compile/linking time. The basic framework of the system may not need to change to support new validators/transformers. It provides an enormous flexibility to the system. The validators and transformers may be specified by the primary device 108. The system may be built with a set of validators and transformers. There may be multiple primary devices for providing the structured query transformers to be executed by the system In one embodiment, new rules not supported by the system may be added to the existing system without changing the existing implementation of the system 102. The new rules may be required to extend the existing validation or transformation rules or the base modules. These new rules may be compiled into an external library and provided to the system 102, which can load these new set of rules. The system 102 may not need to be re-implemented to support the new set of validators or transformers.

Further, the primary device 108 may be an external configuration file which may be generated by text editor or by any other system. The configuration file may be used to provide instructions to the system about the different rules to be executed for processing the distributed data file and also configure the rules by providing the necessary attributes for those rules. The external configuration file may comprise of three segments such as a first segment, a second segment and a third segment. The first segment may be configured to store name, location, format of the input data files, format of the output distributed data files. The second segment may be configured to provide verification rules for the distributed data files. The third segment may be configured to provide validators and, the primary transformers. The structured query transformers may be provided in a separate configuration file(s)

In one embodiment, the distributed data files may be of very large size and thus may require multiple machines to process the large distributed data files. In such case, the primary device 108 may be read by the main processing system and instances of the validators and transformers created and these may be transferred to each of the machines responsible for processing different chunks of the distributed data file, so that all the machines may process the different chunks of the same distributed data files using the same set of instructions.

The data processing module 212 may generate processed data files by processing distributed data files based on one or more characteristics of the distributed data files. The one or more characteristics of the distributed data files may comprise of format of the distributed data files, schema of the distributed data file, verification and validation and transformation rules. The processed data file may be stored in the data warehouse in a format specified by the primary device 108. The format may be a text file, comma separated file, tab separated file, parquet file, tar file, zipped file and the like. The data processing module 212 may process the distributed data files by performing at least one of the following steps.

Step 1: The execution module 214 may execute one of the verification rules, the validators and the primary transformers on the distributed data files, and Step 2: The transformation module 216 may transform the distributed data files by executing the structured query transformers on the distributed data files.

In one embodiment, the primary transformers may be applied to the attributes of the distributed data files and may be configured to transform the distributed data files to a predefined format. The predefined format may comprise csv, tsv, parquet, avro, orc, etc. The predefined format may be consumable by a data warehouse.

In an exemplary embodiment, the primary transformer "Multiply" may be applied to "Multiply an attribute value by predefined constant number" which may convert value of the attribute to required value by multiplying the value with the predefined quantity.

In another exemplary embodiment, the primary transformer "Date" may be applied to convert a date attribute into another date format like a mm-dd-yyyy (month-date-year) to another format like dd-mm-yyyy (date-month-year). There may be plurality of primary transformers such as but are not limited to (a) converting an attribute to a different format for example stripping off decimals from an attribute that may signify price of a commodity, (b) date transformer which may transform dates from say dd-MM-yyyy to MMM-dd-yyyy format, (c) transformer to populate null values with a default value, (d) column joiner transformer which may join two columns like joining first name and last name of a person to provide full name, (e) column splitter transformer which may split a column into multiple columns like splitting an address into address, zipcode, country, etc.

In an exemplary embodiment, various primary transformers may be shown in the table below:

| S. No | Rule | Attribute Type | Explanation |
| --- | --- | --- | --- |
| 1. | DateTransformer | Double | Converts the date time field based on the date format |
| 2. | AttributeSplitter | Text | Split the attribute on the basis of a rule like a comma, space, pattern etc |
| 3. | Multiplier | Float, integer | Convert the column by multiplying with a constant specified |
| 4. | NullValuesRemover | Float, Integer, text | Remove empty attribute values and replace them by 0 for attributes of type float or integer and by "" in case of text |
| 5. | Extractor | Text | Extract a pattern from the attribute value |
| 6. | ColumnJoiner | Text | Join two columns into a new column |

In one embodiment, the verification rules may comprise global rules which may be applied on the distributed data files. The rules may be such as but are not limited to: a) number of missing attributes allowed rule, which specifies constraints on the number of missing attributes allowed for each sample/row of data in a file, which may instruct the system 102 that if the number of missing attributes for each sample of data in the distributed data file exceeds the provided threshold value, the sample of the data to be considered as defective, b) duplicate samples to be allowed or filtered etc. If in case, the verification rules are breached, the data samples may be filtered and stored in an error file having specific name and location provided by the primary device 108

The various validators may be such as but are not limited to (a) whether the field is mandatory or not (NULL value check), (b) any constraint on the length of an alphanumeric field, (c) numeric attribute validation, (d) min value check, (e) the max value check, (f) pattern check i.e., if a field/attribute is a zip code, whether the zip code is of specific format like xxxx or a phone number is of a specific format like xxx-xxx-xxxx etc, (g) referential validation i.e, check whether value in one field should be greater than, equal to or less than the value in another field, lookup check i.e., (h) lookup validator i.e, check whether the attributes are valid values by looking up into a reference store for example if the attribute should contain a country, check whether the value of the attribute is a valid country etc.

In an exemplary embodiment, various validator rules may be shown in the table below:

| S. No | Validators/ rules | Attribute Type | Explanation |
| --- | --- | --- | --- |
| 1. | Mandatory | NA | If set to yes, and attribute is not present, drop the record |
| 2. | Length | Text | Maximum length of a text attribute allowed. |
| 3. | Max | Float, integer | Maximum value of the attribute allowed |
| 4. | Min | Float, Integer | Minimum value allowed. Records with attribute value lower than specified will be marked error records and filtered |
| 5. | Negative | Float, integer | Whether the attribute can be negative or not |
| 6. | Format | Text | The attribute format if any to be enforced. Like zip code xxxx, phone number xxx-xxx-xxxx |
| 7. | Lookup | Any | Look up into the system 102 for the validity of the value in this field. For example, if the data is a state, whether the value specified is valid state. |

In one embodiment, the system 102 may be developed and designed with a set of verification rules, validators and transformers to be supported by the system 102. Over a period of time, the system 102 may be required to add new validators and transformers. The system 102 may dynamically add or replace the verification rules, the validators, the primary transformers and the structured query transformers to the primary device by retaining an existing implementation of the system 102.

In an exemplary embodiment, the system 102 has to transform US$ to Euros, the new set of instructions i.e. verification rules, the validators, the primary transformers and/or the structured query transformers may be added to the primary device by retaining an existing implementation of the system 102.

In one embodiment, the set of instructions stored in the primary device 108 may be read by the system, deserialized and converted to a set of validators and transformers and transferred to the system 102 responsible for executing the instructions while processing the distributed data files. In one aspect, the set of instruction may be reconverted from the deserialized format to a serialized format to be distributed across the network to different such systems involved. The transformation module 216 may execute the structured query transformers on the distributed data files by performing following steps.

Step 1: The transformation module 216 may generate a dependency graph based upon dependencies between the structured query transformers.

Step 2: The transformation module 216 may determine a sequence of execution of the structured query transformers based upon the dependency graph. The sequence of execution of the structured query transformers may be established by resolving unresolved dependencies by looking up to the structure queries. The transformation module may identify missing dependencies and generate errors if there are such missing dependencies.

In one embodiment, the system 102 may maintain a list of the files or tables created in memory 206. It may look up to the memory 206 to find out all the tables in dependency list. For example, let us assume a query "QUERY1", which requires input "table/file" A and B. Let us assume that the output of this query be given a logical name as "C". Another query "QUERY2" may require input table/file A and C and may generate an output table/file named "D". The system 102 may create a dependency list which tells the computer system that for generating data to be stored as "D", it needs data/table named "A" and "C" and for generating "C" it needs data/table "A" and "B". So, the order in which the processing needs to be performed may be to execute QUERY1 first and then QUERY2 even if these structured queries are specified in an unordered manner in the primary device 108.

In one embodiment, the structured query transformers may be received as a key and value pairs. The key may indicate a symbolic name for data generated after transformation performed using structured queries. Further, the value pairs may indicate the structured queries to be applied for the transformation.

In one embodiment, the dependencies may be extracted from the structure queries provided by user device 104 via the primary device 108.

In one embodiment, the system 102 may be configured to generate intermediate temporary tables during execution of the transformations using the structure queries. The temporary tables may be removed after the processing is completed. The temporary tables may be given logical names based upon the type of data in the temporary tables. In one aspect, the temporary tables/files may be removed after execution of the queries.

The data transmission module 218 may transmit the processed data files to the data warehouse.

Figure 3:
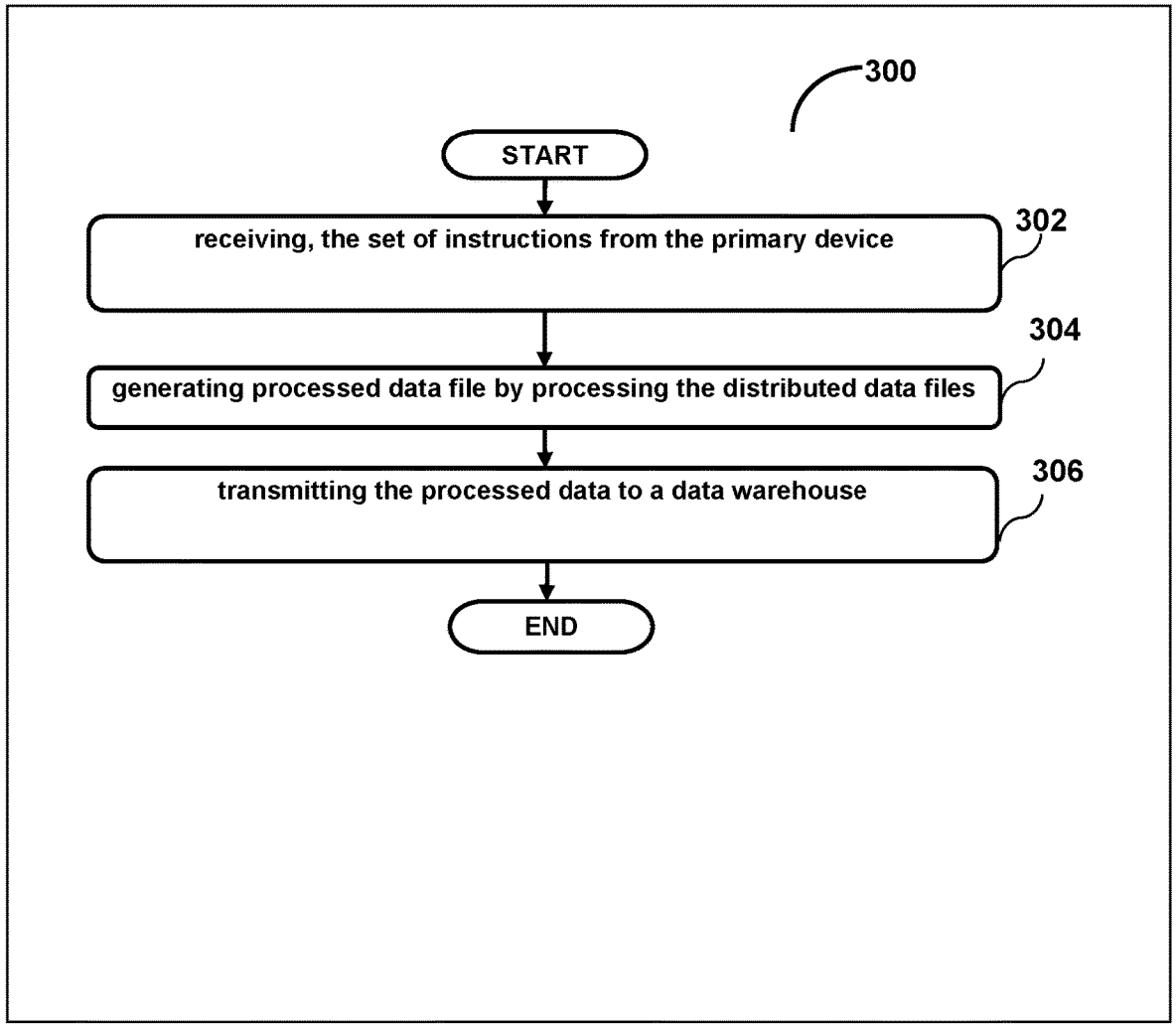
FIG. 3 illustrates a method for processing distributed data files, in accordance with an embodiment of the present subject matter.

Referring now to FIG. 3, a method 300 for processing distributed data files is disclosed, in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, the data receiving module 210 may receive a set of instructions from a primary device 108. The set of instructions may comprise verification rules, validators, primary transformers and structured query transformers. The set of instructions may be converted into a predefined type. The data receiving module 210 may further receive distributed data files from the user device 104. The distributed data files may be of any size, though the system is designed to work with files of very large sizes. Each of the distributed data files may comprise various attributes.

At block 304, The data processing module 212 may generate processed data files by processing distributed data files based on one or more characteristics of the distributed data files. The one or more characteristics of the distributed data files may comprise at least one of formats of the distributed data files, a schema and a processing requirement. The data processing module 212 may process the distributed data files by performing at least one of the following steps.

Step 1: The execution module 214 may execute one of the verification rules, the validators and the primary transformers on the distributed data files, and/or Step 2: The transformation module 216 may transform the distributed data files by executing the structured query transformers on the distributed data files.

The transformation module 216 may execute the structured query transformers on the distributed data files by performing following steps.

Step 1: The transformation module 216 may generate a dependency graph based upon dependencies between the structured query transformers.

Step 2: The transformation module 216 may determine a sequence of execution of the structured query transformers based upon the dependency graph. The sequence of execution of the structured query transformers may be established by resolving unresolved dependencies by looking up to the structure queries.

At block 306, The data transmission module 218 may transmit the processed data files to the data warehouse.

Although implementations for systems and methods for processing distributed data files have been described, it is to be understood that the appended claims are not necessarily limited to the specific features or methods described. Rather, the specific features and methods are disclosed as examples of implementations for processing distributed data files.

The invention claimed is:

1. A system for processing distributed data files, the system comprising:
   a plurality of machines, each comprising one or more processors; and
   a memory coupled with the one or more processors in each of the plurality of machines, wherein the one or more processors are configured to execute instructions stored in the memory to:
      receive one or more of a plurality of chunks of distributed data files from at least one data source and a set of instructions associated with the distributed data files, from a primary device, wherein the set of instructions comprises structured query transformers, and wherein the one or more of the distributed data files and the set of instructions are stored in the memory;
      generate processed data files by processing the one or more chunks of the distributed data files based on one or more characteristics of the distributed data files, wherein the one or more characteristics of the distributed data files comprise at least one of formats of the distributed data files, a schema of the distributed data files, one or more structured query transformers, and a processing requirement, and wherein the one or more chunks of the distributed data files are processed by:
         receiving an instance of the structured query transformers from one of the plurality of machines; and
         transforming the one or more chunks of the distributed data files by executing the instance of the structured query transformers on the one or more chunks of the distributed data files and while retaining an existing implementation of the system, wherein each of the plurality of machines is configured to process a different set of chunks from the plurality of chunks of the distributed data files using the set of instructions, and wherein the execution of the structured query transformers comprises steps of:
  generating a dependency graph based upon dependencies between the structured query transformers; and
  determining a sequence of execution of the structured query transformers based upon the dependency graph, wherein determining the sequence comprises reordering the sequence of execution of the structured query transformers based upon the dependencies; and
transmit the processed data files to a data warehouse, thereby decoupling the processing of the distributed data files from the data warehouse.

2. The system as claimed in claim 1, wherein the set of instructions is in a form of an external configuration file, wherein the external configuration file comprises a name, a location and a format of the distributed data files, and the structured query transformers for transforming the distributed data files.

3. The system as claimed in claim 1, wherein the structured query transformers are received as a key and value pair, wherein the key indicates a symbolic name for data generated after the transformation is performed using the structured query transformers, and wherein the value indicates the structured query transformation to be applied for the transformation.

4. The system as claimed in claim 1, wherein the structured query transformers are configured to transform the distributed data files to a predefined format.

5. The system as claimed in claim 2, further configured to receive a new external configuration file for dynamically adding new structured query transformers, and new data sources, while retaining an existing implementation of the system.

6. The system as claimed in claim 1, wherein the set of instructions stored in the primary device are converted to a serialized format at one of the plurality of machines to be distributed across remaining machines of the plurality of machines in the system, and wherein upon reception of the set of instructions by the remaining machines of the plurality of machines, the set of instructions are reconverted from the serialized format to a deserialized format for execution.

7. The system as claimed in claim 1, further configured to generate intermediate temporary tables during execution of the transformations using the structured query transformers.

8. The system as claimed in claim 1, further configured to execute one or more of the structured query transformers, from the set of instructions associated with the distributed data files to derive an acceptable format, associated with the data warehouse, of the distributed data files while retaining an existing implementation of the system.

9. A method for processing distributed data files, the method comprising:
  receiving, by one or more processors of each of a plurality of machines, one or more of a plurality of chunks of distributed data files from at least one data source and a set of instructions associated with the distributed datafiles, from a primary device, wherein the set of instructions comprises structured query transformers, and wherein the one or more of the distributed data files and the set of instructions are stored in a memory of each of the plurality of machines;
  generating, by the one or more processors, processed data files by processing the one or more chunks of distributed data files based on one or more characteristics of the distributed data files, wherein the one or more characteristics of the distributed data files comprise at least one of formats of the distributed data files, a schema of the distributed data files, one or more structured query transformers, and a processing requirement, and wherein the one or more chunks of distributed data files are processed by:
    receiving an instance of the structured query transformers from one of the plurality of machines; and
    transforming the one or more chunks of the distributed data files by executing the instance of the structured query transformers on the one or more chunks of the distributed data files and while retaining an existing implementation of the system, wherein each of the plurality of machines is configured to process a different set of chunks from the plurality of chunks of the distributed data files using the set of instructions, and wherein the execution of the structured query transformers comprises steps of:
      generating a dependency graph based upon dependencies between the structured query transformers; and
      determining a sequence of execution of the structured query transformers based upon the dependency graph, wherein determining the sequence comprises reordering the sequence of execution of the structured query transformers based upon the dependencies; and
  transmitting, by the one or more processors, the processed data files to a data warehouse, thereby decoupling the processing of the distributed data files from the data warehouse.

10. The method as claimed in claim 9, wherein the set of instructions is in a form of an external configuration file, wherein the external configuration file comprises a name, a location and a format of the distributed data files, and the structured query for transforming the distributed data files.

11. The method as claimed in claim 9, wherein the structured query transformers are received as a key and value pair, wherein the key indicates a symbolic name for data generated after the transformation is performed using the structured query transformers, and wherein the value indicates the structured query transformation to be applied for the transformation.

12. The method as claimed in claim 9, wherein the structured query transformers are configured to transform the distributed data files to a predefined format.

13. The method as claimed in claim 10, further comprising receiving a new external configuration file for dynamically adding new structured query transformers, and new data sources, while retaining an existing implementation of the system.

14. The method as claimed in claim 9, wherein the set of instructions stored in the primary device are converted to a serialized format at one of the plurality of machines to be distributed across remaining machines of the plurality of machines in the system, and wherein upon reception of the set of instructions by the remaining machines of the plurality of machines, the set of instructions are reconverted from the serialized format to a deserialized format for execution.

15. The method as claimed in claim 9, further comprising generating intermediate temporary tables during execution of the transformations using the structured query transformers.

16. The method as claimed in claim 9, further comprising executing one or more of the structured query transformers, from the set of instructions associated with the distributed data files to derive an acceptable format, associated with the data warehouse, of the distributed data files while retaining an existing implementation of the system.

\* \* \* \* \*